United States Patent
Lin et al.

(10) Patent No.: US 10,977,001 B2
(45) Date of Patent: Apr. 13, 2021

(54) ASYMMETRIC QUANTIZATION OF MULTIPLE-AND-ACCUMULATE OPERATIONS IN DEEP LEARNING PROCESSING

(71) Applicant: MediaTek Inc., Hsinchu (TW)

(72) Inventors: Chien-Hung Lin, Hsinchu (TW); Pei-Kuei Tsung, Hsinchu (TW); Chi-Ming Chen, Hsinchu (TW); Meng-Hsuan Cheng, Hsinchu (TW); ShengJe Hung, Hsinchu (TW)

(73) Assignee: MediaTek Inc., Hsinchu (TW)

( * ) Notice: Subject to any disclaimer, the term of this patent is extended or adjusted under 35 U.S.C. 154(b) by 216 days.

(21) Appl. No.: 16/250,874

(22) Filed: Jan. 17, 2019

(65) Prior Publication Data

US 2019/0243610 A1 Aug. 8, 2019

Related U.S. Application Data

(60) Provisional application No. 62/626,191, filed on Feb. 5, 2018.

(51) Int. Cl.
| | |
|---|---|
| *G06F 7/544* | (2006.01) |
| *G06N 3/063* | (2006.01) |
| *G06N 3/04* | (2006.01) |
| *G06N 3/08* | (2006.01) |

(52) U.S. Cl.
CPC ......... *G06F 7/5443* (2013.01); *G06N 3/0454* (2013.01); *G06N 3/0481* (2013.01); *G06N 3/063* (2013.01); *G06N 3/08* (2013.01); *G06F 2207/4824* (2013.01)

(58) Field of Classification Search
CPC .......... G06F 7/5443; G06F 2207/4824; G06N 3/063; G06N 3/0454; G06N 3/08; G06N 3/0481; G06N 3/082
USPC ....................................................... 708/603
See application file for complete search history.

(56) References Cited

U.S. PATENT DOCUMENTS

| | | |
|---|---|---|
| 6,952,710 B2 | 10/2005 | Pelton |
| 2007/0058695 A1* | 3/2007 | Cheng ..................... G01S 19/30 375/148 |
| 2016/0026912 A1 | 1/2016 | Falcon et al. |
| 2016/0358614 A1 | 12/2016 | Phielipp |

(Continued)

*Primary Examiner* — Tan V Mai
(74) *Attorney, Agent, or Firm* — Tong J. Lee (57) ABSTRACT

A processing unit performs multiply-and-accumulate (MAC) operations on asymmetrically quantized data. The processing unit includes a MAC hardware unit to perform the MAC operations on a first data sequence and a second data sequence to generate an asymmetric MAC output. Both the first data sequence and the second data sequence are asymmetrically quantized. The processing unit further includes an accumulator hardware unit to accumulate the first data sequence concurrently with the MAC operations to generate an accumulated output. The processing unit further includes a multiply-and-add (MAD) hardware unit to multiply the accumulated output with a second offset to generate a multiplication output, and to add the multiplication output, the asymmetric MAC output and a pre-computed value calculated before runtime to generate a final output. The second offset indicates an amount of asymmetry of the second data sequence with respect to zero.

19 Claims, 6 Drawing Sheets

(56) References Cited

U.S. PATENT DOCUMENTS

2018/0059215 A1\* 3/2018 Turbiner ................. G01S 13/42
2020/0034145 A1\* 1/2020 Bainville .............. G06F 9/3001

\* cited by examiner

ASYMMETRIC QUANTIZATION OF MULTIPLE-AND-ACCUMULATE OPERATIONS IN DEEP LEARNING PROCESSING

CROSS-REFERENCE TO RELATED APPLICATIONS

This application claims the benefit of U.S. Provisional Application No. 62/626,191 filed on Feb. 5, 2018, the entirety of which is incorporated by reference herein.

TECHNICAL FIELD

Embodiments of the invention relate to neural network computing; more specifically, to hardware circuitry performing multiply-and-accumulate operations.

BACKGROUND

Deep learning has gained wide acceptance for its superior performance in the fields of computer vision, speech recognition, natural language processing, bioinformatics, and the like. Deep learning is a branch of machine learning that uses artificial neural networks containing more than one hidden layer. One core computation performed by a neural network is convolution, which is composed of a sequence of multiply-and-accumulate (MAC) operations.

Neural networks are not only computation-intensive but also incur heavy memory access. For feature extraction, an input image may be convolved with a set of filters over a set of input channels (e.g., red, green and blue), followed by nonlinear computations, down-sampling computations, and class scores computations. The computations typically incur heavy data access to a system memory external to the processors. Some conventional systems reduce the number of bits for representing data values in order to save memory bandwidth at the expense of accuracy. To improve accuracy while saving memory bandwidth, some other conventional systems use asymmetric quantization for reduced-sized data values, as the asymmetric data representation provides higher accuracy than the symmetric data representation with the same number of bits. These asymmetrically quantized values are converted into symmetrically quantized data values before they are used as input to MAC operations. Such a conversion may significantly increase system overhead. Thus, there is a need for improvement in neural network computing.

SUMMARY

In one embodiment, an apparatus is provided for performing multiply-and-accumulate (MAC) operations on asymmetrically quantized data. The apparatus comprises a MAC hardware unit to perform the MAC operations on a first data sequence and a second data sequence to generate an asymmetric MAC output. Both the first data sequence and the second data sequence are asymmetrically quantized. The apparatus further comprises an accumulator hardware unit to accumulate the first data sequence concurrently with the MAC operations to generate an accumulated output. The apparatus further comprises a multiply-and-add (MAD) hardware unit to multiply the accumulated output with a second offset to generate a multiplication output, and to add the multiplication output, the asymmetric MAC output and a pre-computed value calculated before runtime to generate a final output. The second offset indicates an amount of asymmetry of the second data sequence with respect to zero.

In another embodiment, a method is provided for performing MAC operations on asymmetrically quantized data. The method comprises: performing the MAC operations on a first data sequence and a second data sequence to generate an asymmetric MAC output, wherein both the first data sequence and the second data sequence are asymmetrically quantized; accumulating the first data sequence concurrently with the MAC operations to generate an accumulated output; multiplying the accumulated output with a second offset to generate a multiplication output, wherein the second offset indicates an amount of asymmetry of the second data sequence with respect to zero; and adding the multiplication output, the asymmetric MAC output and a pre-computed value calculated before runtime to generate a final output.

Advantages of the embodiments will be explained in detail in the following description.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

Embodiments of the invention provide a system, an apparatus and method for performing accurate and efficient multiply-and-accumulate (MAC) operations on asymmetrically quantized data. The MAC operations may be performed by a neural network processor, which may also be referred to as a deep learning accelerator (DLA) or an accelerator. Convolution, which is a core computation in neural network computing, is composed of a series of MAC operations on input activations and filter weights. To reduce data size and the required bandwidth for transferring data between the main memory and the accelerator, each value of the input activations and filter weights may be quantized to reduce the number of bits that are used to represent the value. For example, a 32-bit floating point number may be represented by an 8-bit integer such that the data size and memory bandwidth is reduced to 25% of the original values. In some conventional systems, the quantization may be symmetric with respect to zero; e.g., each value is represented by an integer between −127 and 127. However, the range of input activations to be processed by a neural network is typically asymmetric with respect to zero (i.e., the minimum value and the maximum value of this range are asymmetric with respect to zero). Likewise, the range of filter weights is also typically asymmetric with respect to zero. Thus, the data subject to the MAC operations may be asymmetrically quantized data.

Generally, asymmetrically quantized values have less quantization error compared to their symmetrically quantized counterparts when the values are represented by the same number of bits. This is because asymmetrical quantization enables all bits to be used by the actual range of values. For example, (n+1) bits may be needed to represent a symmetrically quantized value such that it can have the same accuracy as its asymmetrically quantized counterpart represented by n bits.

Neural network processing is composed of a series of layers. At each layer, an input feature map is processed into an output feature map by a neural network engine (also referred to as "engine") in the accelerator. Each of the input feature map and the output feature map is a multi-dimensional array, also referred to as a tensor. For example, each of the input feature map and the output feature map may have three dimensions, including width, height and depth. For the purpose of explanations, in the following description the width, height and depth dimensions are assumed to be aligned with X, Y and Z dimensions, respectively.

Figure 1:
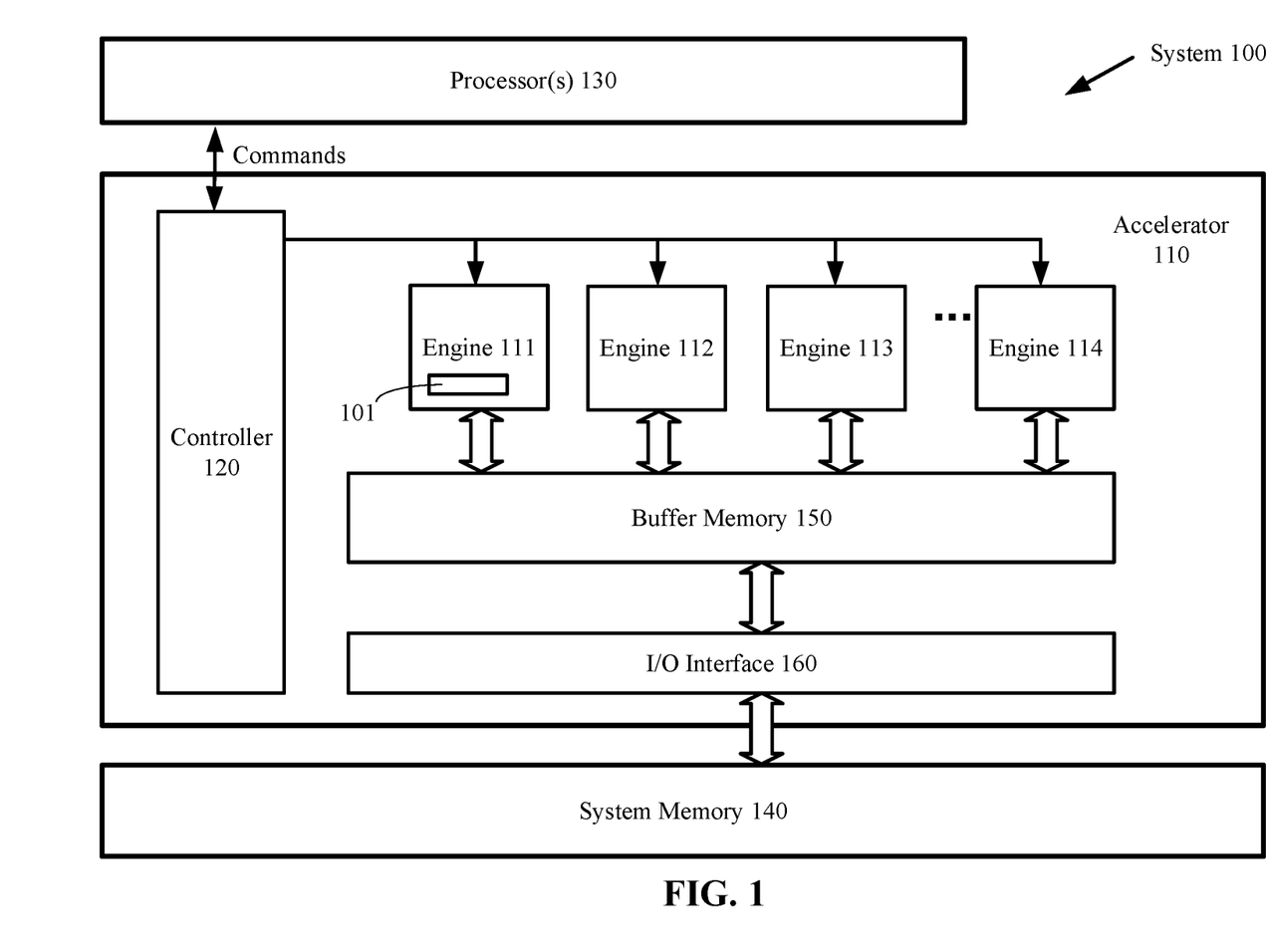
FIG. 1 illustrates a system for neural network computing according to one embodiment.

FIG. 1 illustrates a system 100 for neural network computing according to one embodiment. The system 100 includes one or more processors 130 (e.g., central processing units (CPUs), graphics processing units (GPUs), digital signal processors (DSPs), media processors, or other general-purpose and/or special-purpose processing circuitry). The processors 130 are coupled to a co-processor or processing unit, also referred to as an accelerator 110 which performs neural network operations including, but not limited to, MAC operations on asymmetrically quantized data. The accelerator 110 is also coupled to a system memory 140 external to the accelerator 110. The system memory 140 may include one or more Dynamic Random Access Memory (DRAM) devices or other volatile or non-volatile memory devices.

The accelerator 110 includes one or more engines (e.g., engines 111-114). Each of the engines 111-114 includes hardware circuits (e.g., multipliers, adders, accumulators, etc.) for performing mathematical computations. One of the engines 111-114; e.g., a convolution engine, may include a MAC circuit 101 for performing MAC operations as part of convolution operations. Additionally, the engines 111-114 may include but are not limited to: a rectification engine for performing ReLU operations, a batch normalization (BN) engine, a pooling engine for performing down-sampling operations, etc.

In one embodiment, the accelerator 110 includes a buffer memory 150, which, among other things, stores input data and filter weights for convolution. In one embodiment, the buffer memory 150 may include Static Random Access Memory (SRAM) devices or other volatile or non-volatile memory devices.

The accelerator 110 may also include a controller 120, which dispatches commands from the processor(s) 130 to the engines 111-114. According to the commands, the engines 111-114 retrieve input from the buffer memory 150 and performs neural network computations. The accelerator 110 loads data from, and stores data to, the system memory 140 via an I/O interface 160. Data loaded from the system memory 140 may be stored in the buffer memory 150 for fast data access.

In an alternative embodiment, the controller 120 may be a program sequencer which fetches a program from the system memory 140 to direct the operations of the engines 111-114. The accelerator 110 in this alternative embodiment may be referred to as a neural processing unit (NPU).

Figure 2:
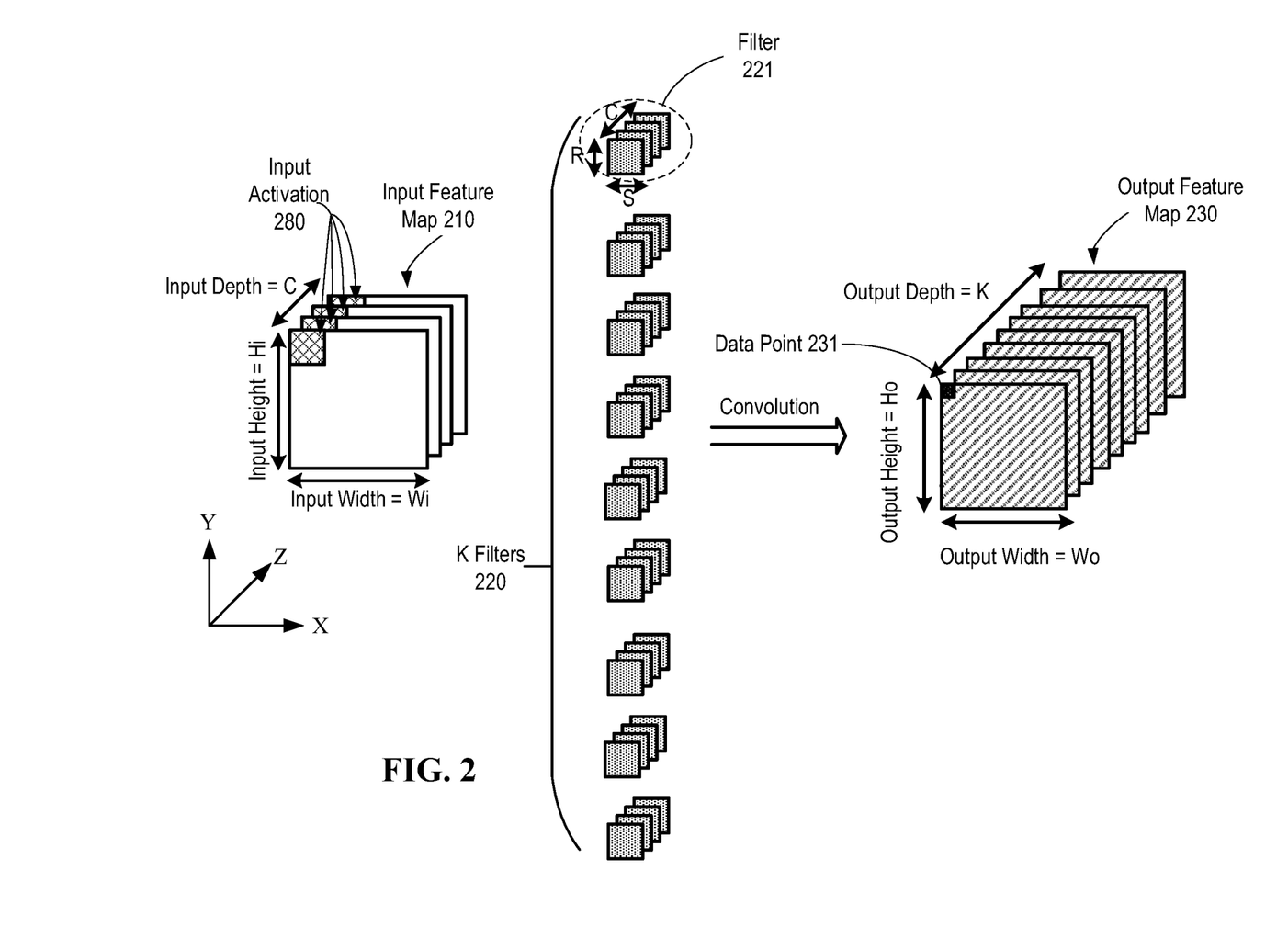
FIG. 2 illustrates an example of a convolution operation.

Before describing embodiments of the invention, it is helpful to explain some terminologies used in the convolution operations. FIG. 2 illustrates an example of a convolution operation. A convolution operation may be performed on an input feature map 210 using a set of filters 220. The input feature map 210 has width=Wi, height=Hi and depth=C. Each filter 220 has width=S, height=R and depth=C. Typically, each filter 220 is smaller in height and width than the input feature map 210. For example, a filter may be composed of 5×5 weights in the XY plane; that is, five weights along the X dimension and five weights along the Y dimension. The input feature map 210 (e.g., an input image) may have hundreds or thousands or more pixels in each of X and Y dimensions. In addition to the X and Y dimensions, the input feature map 210 has a depth (Z) dimension having length C (i.e., C depth slices). Each filter 220 also has C depth slices in the Z dimension. During a convolution pass, a filter (e.g., a filter 221) slides across the input feature map 210 in the XY plane, and dot products are computed between the filter weights and the corresponding values of the input feature map 210. More specifically, the dot products may be computed by MAC operations between the weights of the filter 221 and the portion of the input feature map 210 that is aligned with and has the same size as the filter 221. This portion of the input feature map 210 is referred to as an input activation 280. The same computation process is repeated for each input activation in the input feature map 210.

An output feature map 230 is a representation of the filter response at every spatial position of the input image. The output feature map 230 has width=Wo, height=Ho and depth=K. Convolution with the K filters 220 produces the output feature maps 230 having depth K in the Z dimension (i.e., K depth slices). Each of the K depth slices corresponds to the output of the convolution between the input feature map 210 and one of the K filters 220. Each data point (also referred to as an output data value) in the output feature map 230 is the result of convolution between an input activation and one of the K filters 220. For example, the convolution of the input activation 280 with the filter 221 produces a data point 231 (represented by a black square) in the output feature map 230. This data point 231 may be computed by a sequence of MAC operations. In one embodiment, the input feature map 210 and the filter weights may be stored in the system memory 140 as asymmetrically quantized data to reduce data size and required memory bandwidth.

Referring back to FIG. 1, the accelerator 110 may include a circuit (e.g., the MAC circuit 101) operative to perform MAC operations (herein referred to as "asymmetric MAC operations") on two sequences of asymmetrically quantized data, without first converting them into symmetrically quantized data. It is noted that the term "asymmetric" in "asymmetric MAC operations" refers to the asymmetry of the quantized data, not the operations themselves. As the two sequences may have different offsets with respect to zero, performing MAC operations directly on the two sequences may generate inaccurate results. In one embodiment, the asymmetry may be compensated by adding corrective values to the result of the asymmetric MAC operations. The compensated result (also referred to as "final output") is the same, or approximate within a tolerance, the result of MAC operations (herein referred to as "symmetric MAC operations") on corresponding two sequences of symmetrically quantized data. One corrective value may be computed alongside with (i.e., in parallel with) the asymmetric MAC operations, and the other correct value may be pre-computed prior to the asymmetric MAC operations based on the a priori knowledge of the filters and the range of the input activations. In the following, $Qa[i]$ and $Qw[i][j]$ represent an asymmetrically quantized input activation data point and an asymmetrically quantized filter weight, respectively, and $A[i]$ and $W[i][j]$ represent a symmetrically quantized input activation data point and a symmetrically quantized filter weight, respectively.

In one embodiment, the MAC circuit 101 includes hardware components to perform asymmetric MAC operations as well as the computations of the corrective values. The relationship between the symmetrically quantized data ($A[i]$ and $W[i][j]$) and the asymmetrically quantized counterparts ($Qa[i]$ and $Qw[i][j]$) may be described by the equations below:

$$A[i]=Qa[i]+OFa;  \qquad \text{eq. (1)}$$

$$W[i][j]=Qw[i][j]+OFw[j]; \qquad \text{eq. (2)}$$

$$\Sigma_{i=1}^{N} A[i]*W[i][j] = \Sigma_{i=1}^{N} Qa[i]*Qw[i][j]+OFw[j] \\ *\Sigma_{i=1}^{N} Qa[i]+(OFa*\Sigma_{i=1}^{N} Qw[i][j]+OFa*OFw[j] \\ *N). \qquad \text{eq. (3)}$$

Referring to the convolution example in FIG. 2, the value N in eq. (3) is equal to R×S×C; i.e., the size of one convolution operation between an input activation and a filter. OFa is referred to as a first offset, which indicates the amount of asymmetry, with respect to zero, of the input feature map 210 that contains the input activation. OFw[j], j=1, ..., K is referred to as a second offset, which indicates an amount of asymmetry of the j-th filter weights with respect to zero. The range of the input feature map and, therefore, the first offset (which is the difference between zero and the center of the range) are usually determined at the training phase of a neural network. Likewise, the range of filter weights and, therefore, the second offset are usually determined before the neural network runtime. In one embodiment, the second offset indicates the amount of asymmetry, with respect to zero, of weights of one or more filters used by a neural network. The second offset may have different values for different filters used by a neural network in convolution operations. Alternatively, the second offset may be a constant value for all filters used by a neural network in convolution operations.

For ease of discussion, in the following description with respect to eq. (3) $\Sigma_{i=1}^{N} Qa[i]*Qw[i][j]$ is referred to as an asymmetric MAC output, $\Sigma_{i=1}^{N} Qa[i]$ is referred to as an accumulated output, and $(OFa*\Sigma_{i=1}^{N} Qw[i][j]+OFa*OFw[j]*K)$ is referred to as a pre-computed value. $\Sigma_{i=1}^{N} A[i]*W[i][j]$ is referred to as a final output, which may be a data point in an output feature map. The pre-computed value is calculated from an accumulation of filter weights $Qw[i][j]$ as well as the offsets OFa and OFw[j], all of which may be known at the training phase of a neural network. In one embodiment, the first offset OFa may be calculated on-the-fly at the inference phase of the neural network; that is, different inputs may have different offsets. In one embodiment, the second offset OFw may be filter-dependent; that is, different filters may have different offsets. Alternatively, all filters may have filter weights in a range that is asymmetric with respect to zero. The offset (with respect to zero) of this range may be shared by all of the filters. In one embodiment, the pre-computed value may include a bias value Bias, which is added to the final output to remove (i.e., cancel out) the mean of a sequence of final outputs, where the sequence of final outputs may form one or more depth slices of the output feature map. This is because a neural network typically includes a normalization operation after convolution. The normalization operation causes the sequence of final outputs to have a zero mean and a standard deviation equal to one. Removing the mean from each final output by the bias value during the convolution simplifies the following normalization operation. The bias value may be different for different filters used by the neural network; that is, Bias may be filter-dependent and may therefore be denoted as Bias[j] for the j-th filter. Alternatively, the bias value may be the same for all of the filters used by the neural network.

Figure 3:
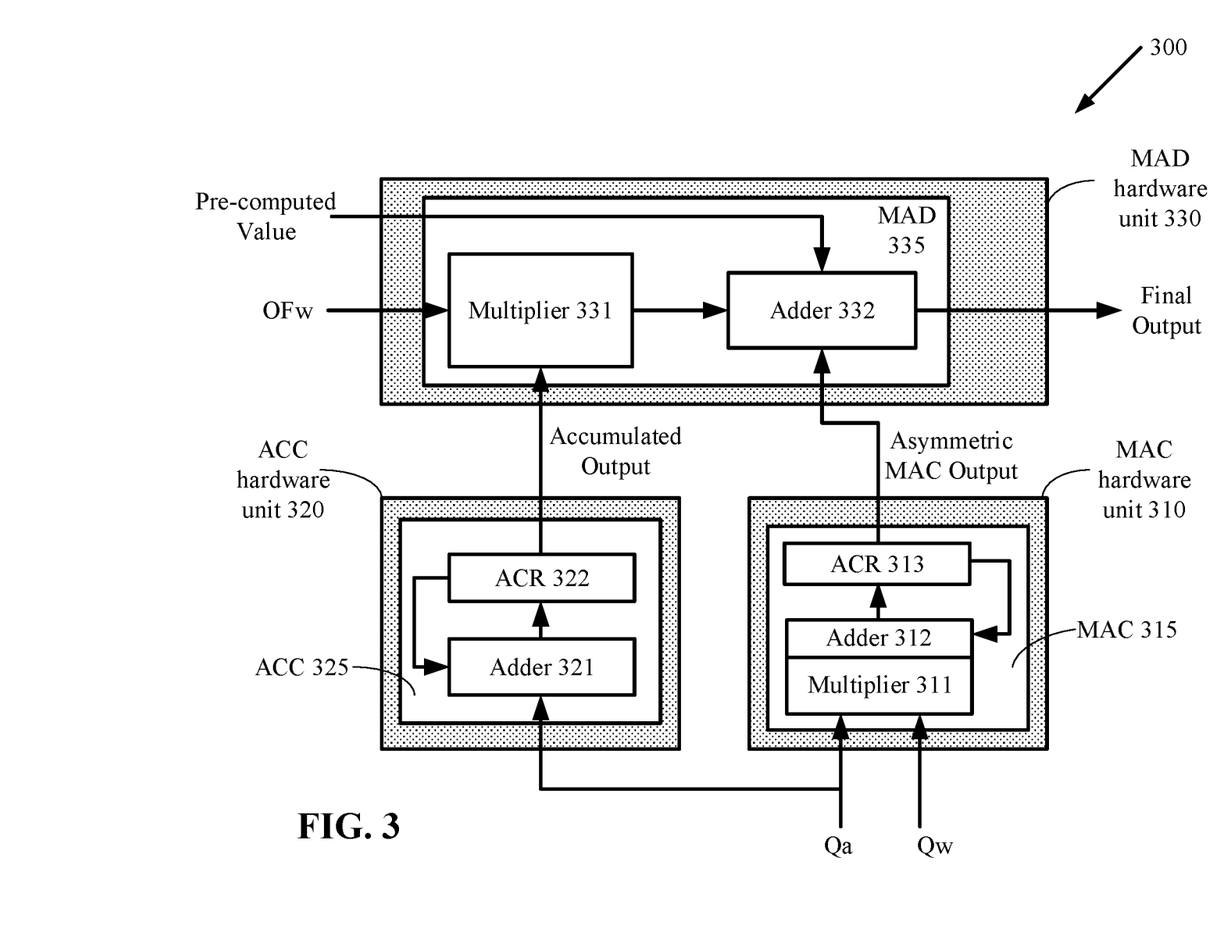
FIG. 3 illustrates a MAC circuit according to a first embodiment.

FIG. 3 illustrates circuitry 300 which is an example of the MAC circuit 101 (FIG. 1) according to one embodiment. The circuitry 300 includes a MAC hardware unit 310, an accumulator hardware unit ("ACC hardware unit") 320, and a multiply-and-add hardware unit ("MAD hardware unit") 330. In this example, the MAC hardware unit 310 includes a MAC 315, which is a hardware component that further includes a multiplier 311, an adder 312 and an accumulating register (ACR) 313. The adder 312 and the ACR 313 form an accumulator which accumulates the output of the multiplier 311. The ACC hardware unit 320 includes an accumulator 325, which is a hardware component that further includes an adder 321 and an ACR 322. The MAD hardware unit 330 includes a multiplier 331 and an adder 332, collectively referred to as a MAD 335. In alternative embodiments, the MAC hardware unit 310 may include more than one multiplier and more than one accumulator, the ACC hardware unit 320 may include more than one accumulator, and the MAD hardware unit 330 may include more than one multiplier and more than one adder.

In one embodiment, the MAC hardware unit 310 generates an asymmetric MAC output. The ACC hardware unit 320 generates an accumulated output. The MAD hardware unit 330 multiplies the accumulated output with OFw, and adds that multiplication result to the asymmetric MAC output and a pre-computed value to generate a final output.

In the example of FIG. 3, two data sequences may be fed into the MAC hardware unit 310 to generate a data point in the output feature map: a first sequence of Qa[i] contains an input activation and a second sequence of Qw[i][j] contains the weights of the j-th filter, where i is a running index from 1 to the size of the input activation (e.g., R×S×C). The data pair (Qa[i], Qw[i][j]) may be fed into the MAC hardware unit 310 every data cycle. The MAC hardware unit 310 operates on the data pair every data cycle and generates an asymmetric MAC output at the end of N data cycles, where N is equal to (R×S×C). The ACC hardware unit 320 receives and accumulates an element of the input activation Qa[i] every data cycle, and generates an accumulated output at the end of N data cycles. The MAD hardware unit 330 operates on the output of the MAC hardware unit 310 and the output of the ACC hardware unit 320 once every time the accumulated output and the asymmetric MAC output are generated (e.g., once every N data cycles). The output of the MAD hardware unit 330 is a final output.

The calculations made by the ACC hardware unit 320 and the MAD hardware unit 330 add corrective values to an asymmetric MAC output. The corrective values convert the asymmetric MAC output into a symmetric MAC output. The overhead of the conversion is minimized because the multiplier 331 (in the MAD hardware unit 330) performs multiplication only once every N data cycles, and the adders 321 and 332 (in the ACC hardware unit 320 and the MAD hardware unit 330) have minimal impact on the overhead. Performing MAC operations directly on asymmetrically quantized data elements, without first converting each of them into a symmetrically quantized data element, significantly reduces the computation overhead.

Figure 4:
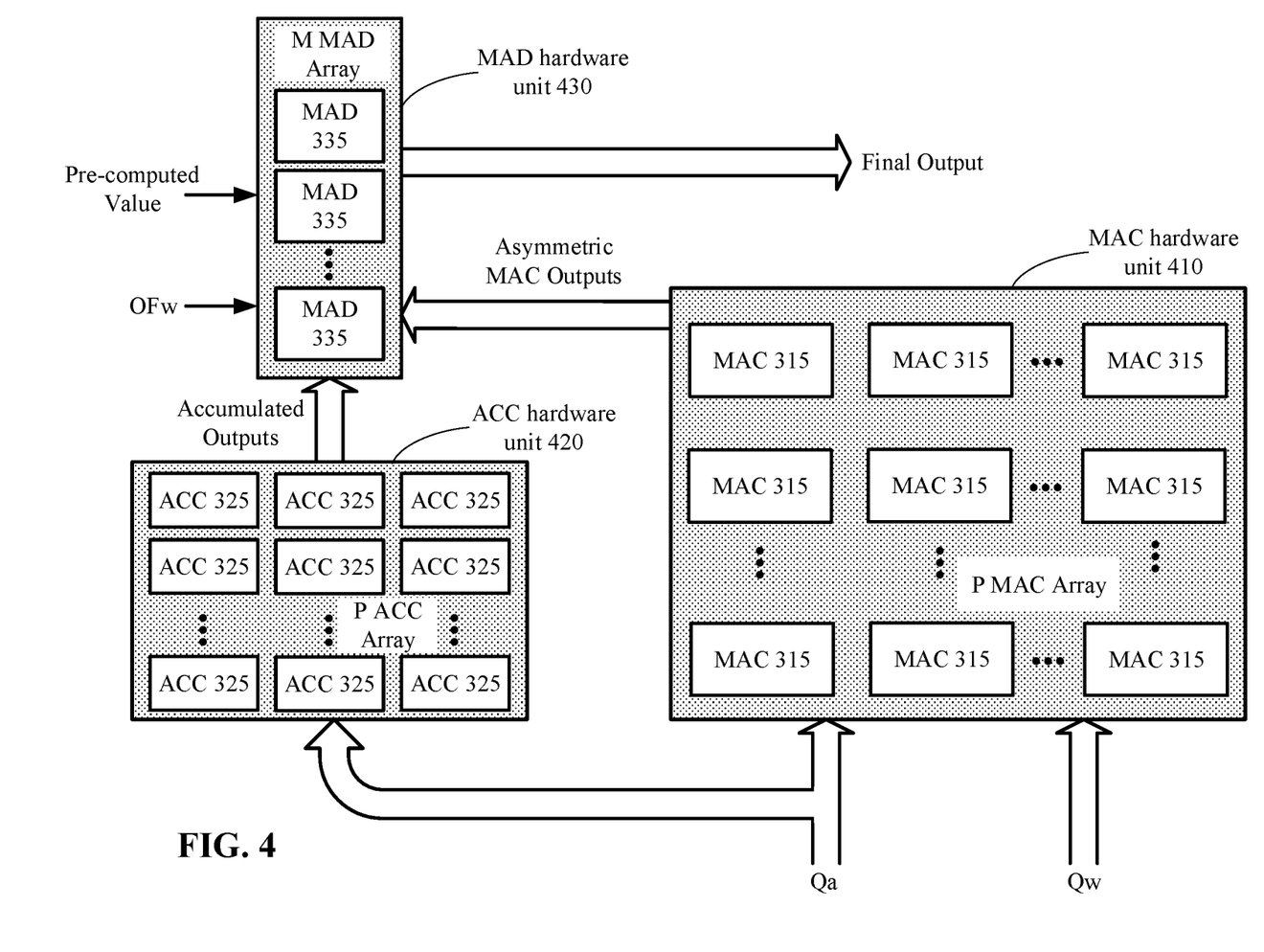
FIG. 4 illustrates a MAC circuit according to a second embodiment.

FIG. 4 illustrates circuit 400 which is an example of the MAC circuit 101 (FIG. 1) according to another embodiment. The circuit 400 includes a MAC hardware unit 410 which further includes multiple MACs 315 (FIG. 3). In one embodiment, the MAC hardware unit 410 may include an array of P MACs 315, where P is an integer greater than one. The P MACs 315 may work in parallel on P different input activations and the weights of the same filter. Referring to the example of FIG. 2, in an embodiment where P is equal to Wo×Ho, the MAC hardware unit 410 can generate P asymmetric MAC outputs that correspond to all of the XY-plane data points in the output feature map 230 every N data cycles (e.g., N=R×S×C). All of the XY-plane data points in the output feature map 230 are generated with a single filter. In alternative embodiments, P may be equal to a different value best suited for the intended calculations.

The circuit 400 further includes an ACC hardware unit 420 which further includes an array of P accumulators 325. The ACC hardware unit 420 works every data cycle and generates P accumulated outputs at the end of every N data cycles. The circuit 400 further includes a MAD hardware unit 430 which further includes M MADs 335, where M is a non-negative integer. In one embodiment, M is no greater than P. The MAD hardware unit 430 receives P asymmetric MAC outputs and P accumulated outputs every N data cycles. The value of M may be determined based on the throughput requirement of the circuit 400. For M=1, the MAD hardware unit 430 generates P final outputs sequentially, one at a time. For M=P, the MAD hardware unit 430 generates P final outputs in parallel.

Figure 5:
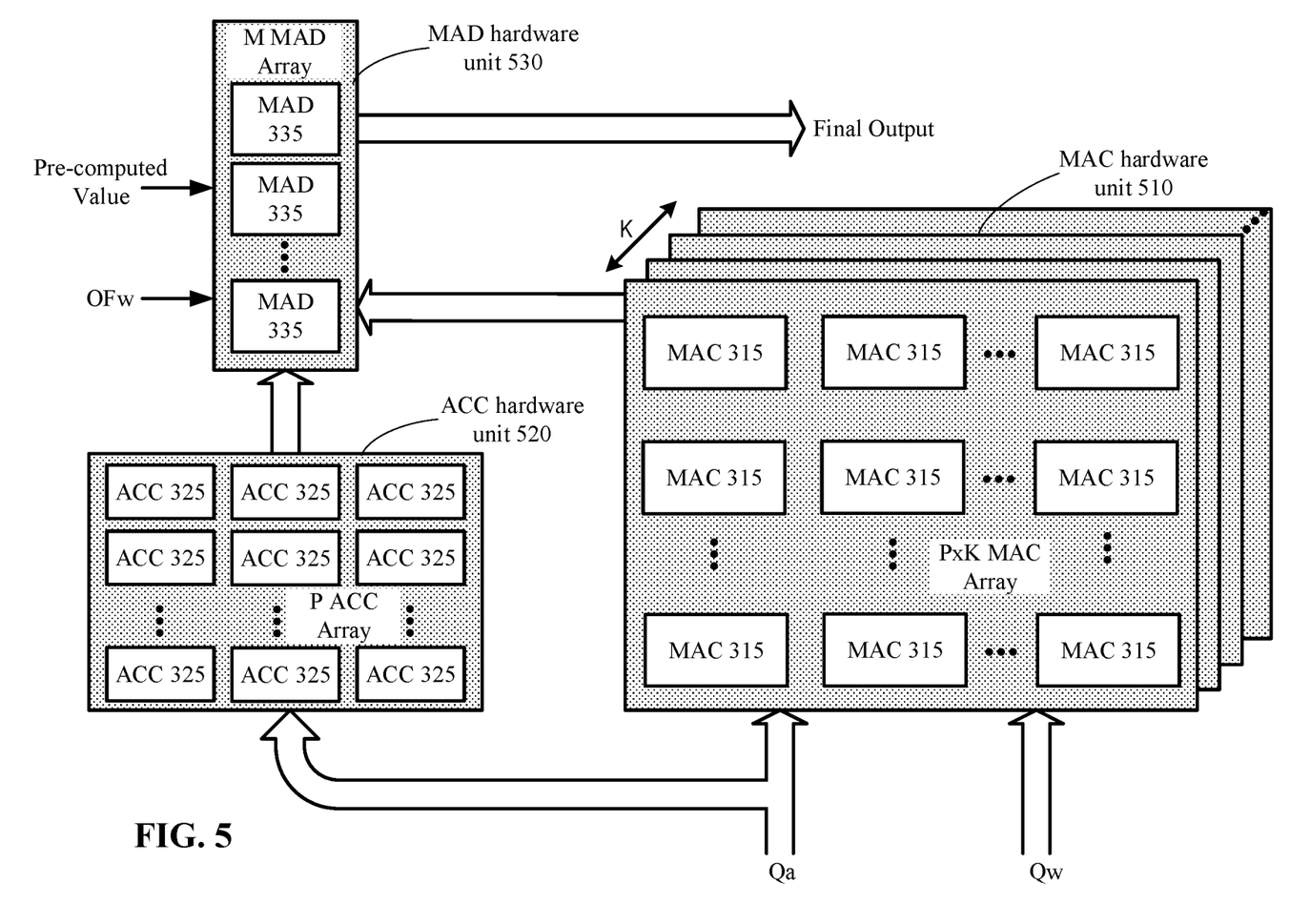
FIG. 5 illustrates a MAC circuit according to a third embodiment.

FIG. 5 illustrates a circuit 500 which is an example of the MAC circuit 101 (FIG. 1) according to yet another embodiment. Similar to the circuit 300 in FIG. 3 and the circuit 400 in FIG. 4, the circuit 500 includes a MAC hardware unit 510, an ACC hardware unit 520 and a MAD hardware unit 530. The MAC hardware unit 510 further includes an array of (P×K) MACs 315. Referring to the example of FIG. 2, K is the number of Z-dimension depth slices in the output feature map 230. The (P×K) MACs 315 may work in parallel on P different input activations and the weights of K filters. Thus, in N data cycles (e.g., N=R×S×C), the MAC hardware unit 510 can generate (P×K) asymmetric MAC outputs that correspond to the entire output feature map 230. The ACC hardware unit 520 includes an array of P accumulators 325, each accumulating a respective input activation of size N. The ACC hardware unit 520 works every data cycle and generates P accumulated outputs at the end of every N data cycles. The MAD hardware unit 530 includes M MADs 325, where M is a non-negative integer. The MAD hardware unit 530 receives (P×K) asymmetric MAC outputs and P accumulated outputs at the end of every N data cycles. Each accumulated output is calculated from the same input activation, and can be reused K times as a corrective value for a group of K asymmetric MAC outputs that share the same input activation. The value of M may be determined based on the throughput requirement of the circuit 500. For M=1, the MAD hardware unit 530 generates (P×K) final outputs sequentially, one at a time. For M=P×K, the MAD hardware unit 530 generates P×K final outputs in parallel.

The MAC operations described herein may be part of a convolution operation implemented as a dot-product between two data sequences. Alternatively, the MAC operations may be part of a different operation. For example, the Winograd fast algorithm for convolution may also use the aforementioned MAC operations. The Winograd fast algorithm includes four steps: (1) transformation of filter weights, (2) transformation of an input activation, (3) element-wise multiplication between the transformed input activation and the transformed filter weights in corresponding depth slices, and accumulation of the element-wise multiplication results in the same (X,Y) coordinate position across all depth slices in the Z dimension, and (4) transformation of the result of (3). The transformation matrices used in the Winograd fast algorithm are known in the art and therefore are not described herein. Applying these transformation matrices to a data array is herein called "Winograd transforming the data array." The element-wise multiplication and the accumulation across the Z dimension may be performed by the circuits 300, 400 or 500 described above.

Referring back to the example of FIG. 2, the input activation 280 and the weights of each filter 220 are asymmetrically quantized. The Winograd fast algorithm first transforms each filter into the same size as the input activation. For example, the input activation may have width=4, height=4 and depth=C. Each of the filters may have width=3, height=3 and depth=C. The weights of all K filter 220 are first Winograd transformed from (3×3×C×K) into a (4×4×C×K) array denoted as Qw'[i][j] where i=1, . . . , C and j=1, . . . , K. For each (4×4×C) input activation in the input feature map, the following steps (a)-(c) are repeated until the entire feature map is processed. At step (a), the input activation is Winograd transformed into a (4×4×C) array denoted as Qa'[i] where i=1, . . . , C. At step (b), for each filter j=1, . . . , K, element-wise multiplication is performed between Qa'[i] and Qw'[i][j]. The element-wise multiplication results in the same (X,Y) coordinate position are accumulated across all depth slices. The element-wise multiplication and the accumulation may be performed directly on the asymmetrically quantized data as the aforementioned asymmetric MAC operations, and corrective values may be added to the results of the asymmetric MAC operations. More specifically, the operations for each filter j=1, . . . , K at step (b) may be described by the equations below.

$$A'[i]=Qa'[i]+OFa'; \qquad \text{eq. (4)}$$

$$W'[i][j]=Qw'[i][j]+OFw'[j]; \qquad \text{eq. (5)}$$

$$\sum_{i=1}^{C} A'[i]*W'[i][j]=\sum_{i=1}^{C} Qa'[i]*Qw'[i][j]+OFw'[j] \\ *\sum_{i=1}^{C} Qa'[i]+(OFa'*\sum_{i=1}^{C} Qw'[i][j]+OFa'*OFw' \\ [j]*C). \qquad \text{eq. (6)}$$

A'[i] and W'[i][j] are the symmetrically quantized input activation and the weights of i-th filter, respectively, OFa' and OFw'[j] are the offsets of the asymmetrically quantized input activation and the weights of the j-th filter, respectively. Thus, as mentioned before in connection with eq. (1)-eq. (3), symmetric MAC operations, which are performed on symmetrically quantized data (e.g., A'[i] and W'[i][j]), can be converted to asymmetric MAC operations plus a number of corrective values. It is noted that the running index i is from 1 to C (the depth), and the array size for the element-wise multiplication is the size of the input activation in the XY plane (e.g., 4×4 in this example). At step (c), an inverse Winograd transformation is applied to the result of $\Sigma_{i=1}^{C} A'[i]*W'[i][j]$ to generate a convolution result.

Figure 6:
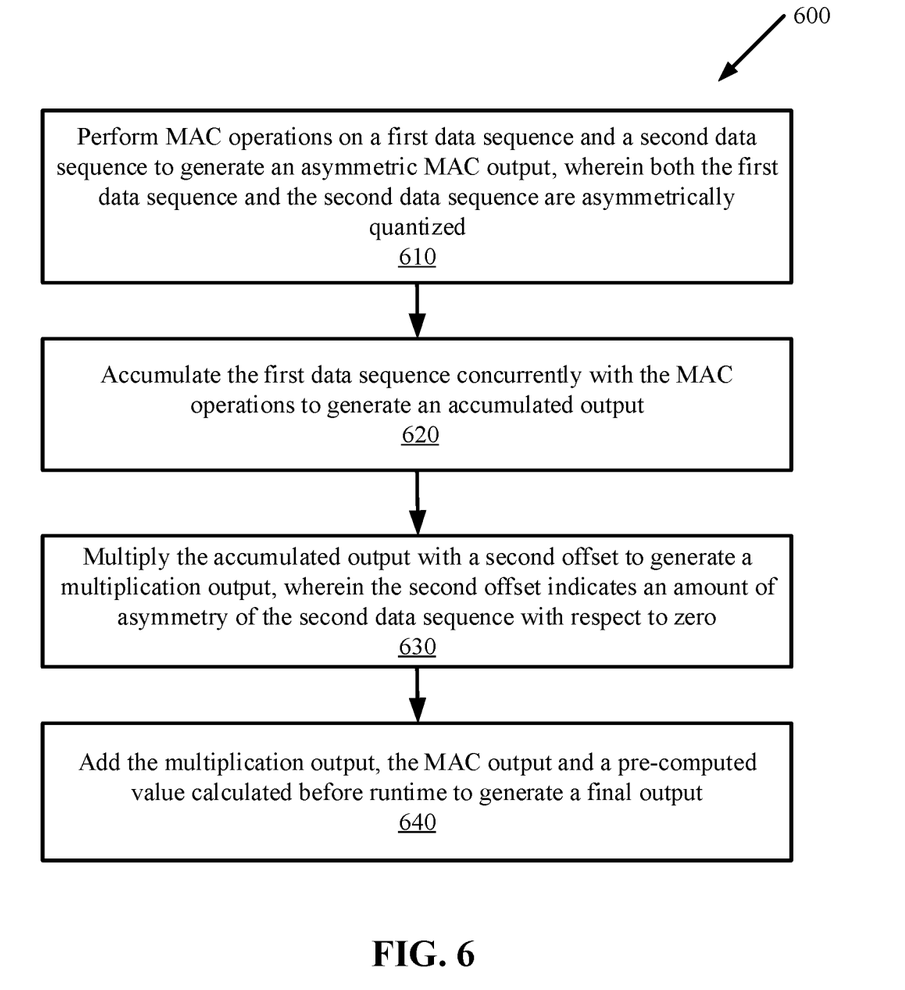
FIG. 6 is a flow diagram illustrating a method for performing MAC operations for asymmetrically quantized data according to one embodiment.

FIG. 6 is a flow diagram illustrating a method 600 for performing MAC operations on asymmetrically quantized data according to one embodiment. In one embodiment, the method 600 may be performed by a neural network processor; e.g., the accelerator 100 of FIG. 1.

The method 600 begins at step 610 when a MAC circuit performs MAC operations on a first data sequence and a second data sequence to generate an asymmetric MAC output. Both the first data sequence and the second data sequence are asymmetrically quantized. At step 620, an accumulator unit accumulates the first data sequence concurrently with the MAC operations to generate an accumulated output. At step 630, the accumulated output is multiplied by a second offset to generate a multiplication output. The second offset indicates an amount of asymmetry of the second data sequence with respect to zero. At step 640, the multiplication output, the asymmetric MAC output and a pre-computed value calculated before runtime are added together to generate a final output. In one embodiment, the pre-computed value may be calculated from at least a first offset, the second offset and an accumulation of the second data sequence. The first offset indicates an amount of asymmetry of the first data sequence with respect to zero. In some embodiments, steps 610 and 620 may be executed in parallel.

The operations of the flow diagram of FIG. 6 have been described with reference to the exemplary embodiments of FIGS. 1 and 3-5. However, it should be understood that the operations of the flow diagram of FIG. 6 can be performed by embodiments of the invention other than the embodiments discussed with reference to FIGS. 1 and 3-5, and the embodiments discussed with reference to FIGS. 1 and 3-5 can perform operations different than those discussed with reference to the flow diagram. While the flow diagram of FIG. 6 shows a particular order of operations performed by certain embodiments of the invention, it should be understood that such order is exemplary (e.g., alternative embodiments may perform the operations in a different order, combine certain operations, overlap certain operations, etc.).

Various functional components or blocks have been described herein. As will be appreciated by persons skilled in the art, the functional blocks will preferably be implemented through circuits (either dedicated circuits, or general purpose circuits, which operate under the control of one or more processors and coded instructions), which will typically comprise transistors that are configured in such a way as to control the operation of the circuitry in accordance with the functions and operations described herein.

While the invention has been described in terms of several embodiments, those skilled in the art will recognize that the invention is not limited to the embodiments described, and can be practiced with modification and alteration within the spirit and scope of the appended claims. The description is thus to be regarded as illustrative instead of limiting.

What is claimed is:

1. An apparatus for performing multiply-and-accumulate (MAC) operations on asymmetrically quantized data, comprising:
  a MAC hardware unit to perform the MAC operations on a first data sequence and a second data sequence to generate an asymmetric MAC output, wherein both the first data sequence and the second data sequence are asymmetrically quantized;
  an accumulator hardware unit to accumulate the first data sequence concurrently with the MAC operations to generate an accumulated output; and
  a multiply-and-add (MAD) hardware unit to multiply the accumulated output with a second offset to generate a multiplication output, wherein the second offset indicates an amount of asymmetry of the second data sequence with respect to zero, and to add the multiplication output, the asymmetric MAC output and a pre-computed value calculated before runtime to generate a final output.

2. The apparatus of claim 1, wherein the pre-computed value is calculated from at least a first offset, the second offset and an accumulation of the second data sequence, and wherein the first offset indicates an amount of asymmetry, with respect to zero, of an input feature map that contains the first data sequence.

3. The apparatus of claim 1, wherein the pre-computed value further includes a bias, which has different values for different filters or a same value for all filters used by a neural network.

4. The apparatus of claim 1, wherein the second offset indicates the amount of asymmetry, with respect to zero, of weights of one or more filters used by a neural network.

5. The apparatus of claim 1, wherein the MAC hardware unit includes a MAC hardware component to perform the MAC operations on an input activation of an input feature map and weights of a filter to thereby generate the asymmetric MAC output, and wherein the accumulator hardware unit includes an accumulator to accumulate the input activation concurrently with the MAC operations to thereby generate the accumulated value.

6. The apparatus of claim 1, wherein the MAC hardware unit includes a plurality of MAC hardware components to perform the MAC operations on a plurality of input activations of an input feature map and filter weights, and wherein the accumulator hardware unit includes a plurality of accumulators to accumulate each of the input activations concurrently with the MAC operations.

7. The apparatus of claim 6, wherein the MAC hardware unit includes P MAC hardware components to perform the MAC operations in parallel, and the accumulator hardware unit includes P accumulators to operate concurrently with the MAC operations, and wherein P is an integer greater than one.

8. The apparatus of claim 6, wherein the MAC hardware unit includes (P×K) MAC hardware components to perform the MAC operations in parallel, and the accumulator hardware unit includes P accumulators to operate concurrently with the MAC operations, and wherein P is an integer greater than one, and K is the number of filters having the filter weights.

9. The apparatus of claim 1, wherein the MAD hardware unit includes a plurality of MAD hardware components to operate in parallel, and wherein the number of the MAD hardware components depends at least on a throughput requirement of the MAC operations.

10. The apparatus of claim 1, wherein the MAC hardware unit includes one or more MAC hardware components, the accumulator hardware unit includes one or more accumulators, and the MAD hardware unit includes one or more multipliers and one or more adders, each of the MAC hardware component and the accumulator operate every data cycle and each of the multiplier and the adder in the MAD hardware unit operate once every time the accumulated output and the asymmetric MAC output are generated.

11. The apparatus of claim 1, wherein the first data sequence is a Winograd transformed input activation and the second data sequence is Winograd transformed filter weights, the MAC operations include element-wise multiplication of the first data sequence and the second data sequence in corresponding depth slices, and accumulation of results of the element-wise multiplication in the same (X,Y) coordinate position across all depth slices.

12. An accelerator for performing neural network operations, comprising:
   a buffer memory; and
   one or more engines coupled to the buffer memory and including hardware circuits to perform mathematical operations, wherein one of the engines includes a multiply-and-accumulate (MAC) circuit to perform operations on asymmetrically quantized data, the MAC circuit operative to:
   perform the MAC operations on a first data sequence and a second data sequence to generate an asymmetric MAC output, wherein both the first data sequence and the second data sequence are asymmetrically quantized;
   accumulate the first data sequence concurrently with the MAC operations to generate an accumulated output;
   multiply the accumulated output with a second offset to generate a multiplication output, wherein the second offset indicates an amount of asymmetry of the second data sequence with respect to zero; and
   add the multiplication output, the asymmetric MAC output and a pre-computed value calculated before runtime to generate a final output.

13. The accelerator of claim 12, wherein the MAC circuit is further operative to:
   calculate the pre-computed value from at least a first offset, the second offset and an accumulation of the second data sequence, wherein the first offset indicates an amount of asymmetry, with respect to zero, of an input feature map that contains the first data sequence.

14. The accelerator of claim 12, wherein the pre-computed value further includes a bias, which has different values for different filters or a same value for all filters used by a neural network.

15. The accelerator of claim 12, wherein the second offset indicates the amount of asymmetry, with respect to zero, of weights of one or more filters used by a neural network.

16. The accelerator of claim 12, wherein the first data sequence is an input activation of an input feature map and the second data sequence is weights of a filter.

17. The accelerator of claim 12, wherein the MAC circuit is further operative to:
   perform the MAC operations, in parallel, on a plurality of input activations of an input feature map and filter weights; and
   accumulate each of the input activations concurrently with the MAC operations.

18. The accelerator of claim 12, wherein the MAC circuit is further operative to:
   perform the MAC operations and accumulation of the first data sequence every data cycle; and
   perform the multiplying and the adding once every time the accumulated output and the asymmetric MAC output are generated.

19. The accelerator of claim 12, wherein the first data sequence is a Winograd transformed input activation and the second data sequence is Winograd transformed filter weights, the MAC operations include element-wise multiplication of the first data sequence and the second data sequence in corresponding depth slices, and accumulation of results of the element-wise multiplication in the same (X,Y) coordinate position across all depth slices.

* * * * *